United States Patent
Tsutsumi et al.

(10) Patent No.: US 12,162,971 B2
(45) Date of Patent: Dec. 10, 2024

(54) HEAT-CURABLE MALEIMIDE RESIN COMPOSITION

(71) Applicant: Shin-Etsu Chemical Co., Ltd., Tokyo (JP)

(72) Inventors: Yoshihiro Tsutsumi, Annaka (JP); Yuki Kudo, Annaka (JP); Shinsuke Yamaguchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/550,439

(22) Filed: Dec. 14, 2021

(65) Prior Publication Data

US 2022/0195096 A1     Jun. 23, 2022

(30) Foreign Application Priority Data

Dec. 18, 2020   (JP) .................. 2020-210426

(51) Int. Cl.
     *C08F 283/04*     (2006.01)
     *C08J 5/24*     (2006.01)
     *C09J 179/08*     (2006.01)

(52) U.S. Cl.
     CPC ............... *C08F 283/04* (2013.01); *C08J 5/24* (2013.01); *C09J 179/08* (2013.01); *C08J 2379/08* (2013.01)

(58) Field of Classification Search
     CPC ........ C08F 283/04; C08J 5/24; C08J 2379/08; C09J 179/08
     USPC ....................................................... 523/207
     See application file for complete search history.

(56) References Cited

U.S. PATENT DOCUMENTS

| | | |
|---|---|---|
| 9,538,646 B2 | 1/2017 | Onodera et al. |
| 10,434,750 B2 | 10/2019 | Takeuchi et al. |
| 2009/0306306 A1* | 12/2009 | Ohkido ............... C08K 5/3415 525/410 |
| 2016/0244611 A1* | 8/2016 | Yang .................... H05K 1/0373 |
| 2020/0247972 A1 | 8/2020 | Sato et al. |
| 2020/0270411 A1 | 8/2020 | Kitai et al. |

FOREIGN PATENT DOCUMENTS

| | | |
|---|---|---|
| JP | 2013-74129 A | 4/2013 |
| JP | 2014-1289 A | 1/2014 |
| JP | 2017-78102 A | 4/2017 |
| JP | 2019-104818 A | 6/2019 |
| JP | 2020-56011 A | 4/2020 |
| WO | WO 2013/065453 A1 | 5/2013 |
| WO | WO 2016/114287 A1 | 7/2016 |
| WO | WO 2019/065940 A1 | 4/2019 |
| WO | WO 2019/065941 A1 | 4/2019 |

OTHER PUBLICATIONS

Takao, JP 2014-001289 A machine translation in English, Jan. 9, 2014. (Year: 2014).*

* cited by examiner

*Primary Examiner* — David T Karst
(74) *Attorney, Agent, or Firm* — Birch, Stewart, Kolasch & Birch, LLP

(57) ABSTRACT

Provided are a heat-curable maleimide resin composition suitable for use in a substrate, and whose cured product has an excellent high-temperature property due to its high glass-transition temperature, an excellent dielectric property and an excellent dimension stability; and an uncured and cured resin films comprised of such composition, and having an excellent handling property. The heat-curable maleimide resin composition contains:

(A) a maleimide resin having a number average molecular weight of not lower than 3,000;

(B) an organic compound having, in one molecule, at least one allyl group and at least one isocyanuric ring; and (C) a reaction initiator.

15 Claims, No Drawings

HEAT-CURABLE MALEIMIDE RESIN COMPOSITION

BACKGROUND OF THE INVENTION

Field of the Invention

The present invention relates to a heat-curable maleimide resin composition; and an uncured and cured films comprised of such resin composition.

Background Art

In recent years, the next-generation mobile communication system "5G" has become a trend; a high-speed, high-capacity and low-latency communication is on the way. In order to realize such communication, materials for use in the high-frequency band are required, and it is essential that a transmission loss be reduced as a countermeasure to noise. Thus, an insulation material with an excellent dielectric property needs to be developed.

Particularly, demanded is an insulation material for use in a substrate and having an excellent dielectric property as mentioned above. Even in terms of a use in a substrate, demanded in particular are insulation materials having excellent dielectric properties with respect to, for example, a rigid substrate and a flexible substrate; reactive polyphenylene ether resins (PPE) are increasingly used in the case of a rigid substrate, and liquid crystal polymers (LCP) and products called modified polyimide (MPI) with improved properties are increasingly used in the case of a flexible printed substrate (FPC).

While these materials have superior characteristics, it is also true that they have many problems. For example, while a reactive PPE resin has an excellent dielectric property and a high glass-transition temperature (Tg), it is inferior in adhesion force and has in recent years exhibited a problem(s) in insulation resistance in long-term reliability tests (e.g. WO2019/65940 and WO2019/65941). As for LCP, many inventions have been disclosed, including, for example, LCPs with even higher performances as well as FPC base films and coverlay films using LCP (e.g. WO2013/65453 and JP-A-2013-74129). However, LCP still has many points to be improved, such as the fact that its use is limited as it is difficult to mass-produce LCPs to meet demand; the fact that molding at a high temperature of 300° C. or higher is essential, which is a problem unique to a thermoplastic resin; and the fact that an adhesive agent with a low dielectric property is required to attach a copper-clad laminate thereto.

In this regard, the usage of MPI is being considered in certain frequency bands, and many inventions have been disclosed even with regard to MPI (e.g. JP-A-2017-78102 and JP-A-2019-104818). It is now clear that while these MPIs have dielectric properties that are improved as compared to the conventional polyimides, since they are also thermoplastic resins as is the case with LCP, not only they have problems similar to those of LCP, but the dielectric properties thereof will deteriorate significantly due to a moisture absorbency unique to polyimides. Although there has also been disclosed a MPI having a dimer diamine skeleton in order to solve these problems (e.g. JP-A-2020-56011), this MPI has a glass-transition temperature (Tg) significantly lower than those of the conventional MPIs, and lacks a dimension stability. Further, when producing MPI, it is essential that there be used a large amount of an aprotic polar solvent such as N-methyl pyrrolidone (NMP); the usage of an aprotic polar solvent is not preferable in terms of environment preservation.

Thus, in recent years, maleimide resin has gained attention as a material close to polyimide. Even among maleimide resins, bismaleimide resin is common; many of them are known to have low molecular weights, and an excellent high-temperature property is exhibited as having, for example, a high Tg. However, in the case of a bismaleimide resin, an uncured product thereof lacks film property, a cured product thereof is hard and brittle, and a dielectric property of the cured product is insufficient as compared to that of LCP and MPI i.e. there is still a lot of margin for improvement.

In this respect, there are disclosed a composition using, as a material for FPC, a maleimide compound substantively having a dimer diamine skeleton; and a cured product thereof (WO2016/114287). While this composition is significantly superior in dielectric property, the characteristics thereof are opposite to those of a general maleimide resin as having a low Tg and a high coefficient of thermal expansion (CTE), and thus still lacking dimension stability. Further, since the composition is a mixture of a long-chain alkyl group-containing bismaleimide resin and a hard and low-molecular aromatic maleimide resin, a poor compatibility is observed such that the properties of this composition and its cured product may vary easily, and curing may easily take place in an uneven manner.

Meanwhile, there is disclosed a liquid resin composition for semiconductor encapsulation that contains the above particular maleimide and an allyl compound (JP-A-2014-1289).

SUMMARY OF THE INVENTION

However, the resin composition disclosed in JP-A-2014-1289 was not satisfactory as an insulation material for use in a substrate, which has to be superior in dielectric property.

Thus, it is an object of the present invention to provide a heat-curable maleimide resin composition that is suitable for use as an insulation material superior in dielectric property, particularly suitable for use in a substrate, and has an excellent high-temperature property as a cured product of the composition has a high glass-transition temperature (Tg), an excellent dielectric property and an excellent dimension stability; and an uncured and cured resin films comprised of such composition and having an excellent handling property. Further, it is also an object of the present invention to provide a substrate using these composition and films.

The inventors of the present invention diligently conducted a series of studies to solve the above problems, and completed the invention as follows. That is, the inventors found that the heat-curable maleimide resin composition shown below was able to achieve the abovementioned objects.

[1]

A heat-curable maleimide resin composition comprising:
(A) a maleimide resin represented by the following formula (1) and having a number average molecular weight of not lower than 3,000;
(B) an organic compound having, in one molecule, at least one allyl group and at least one isocyanuric ring; and
(C) a reaction initiator,

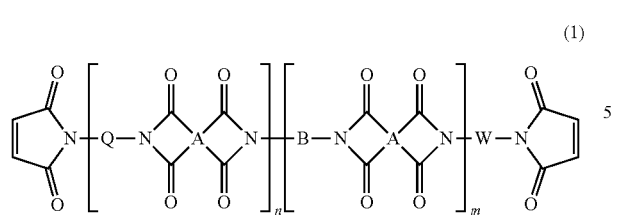
(1)

wherein A independently represents a tetravalent organic group having a cyclic structure, B independently represents a divalent hydrocarbon group having 6 to 200 carbon atoms, Q independently represents a divalent alicyclic hydrocarbon group that has 6 to 60 carbon atoms and a cyclohexane skeleton represented by the following formula (2), W is either B or Q, n is 1 to 100, m is 0 to 100, repeating units identified by n and m are present in any order, a bonding pattern of the repeating units n and m may be alternate, block or random,

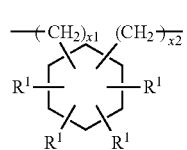
(2)

wherein $R^1$ independently represents a hydrogen atom or an alkyl group having 1 to 5 carbon atoms, each of x1 and x2 independently represents a number of 0 to 4.

[2]

The heat-curable maleimide resin composition according to [1], wherein A in the formula (1) represents any one of the tetravalent organic groups expressed by the following structural formulae:

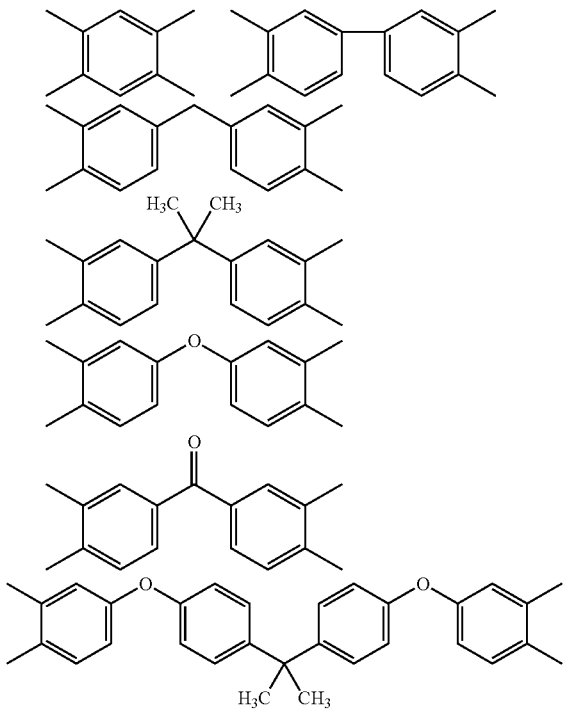

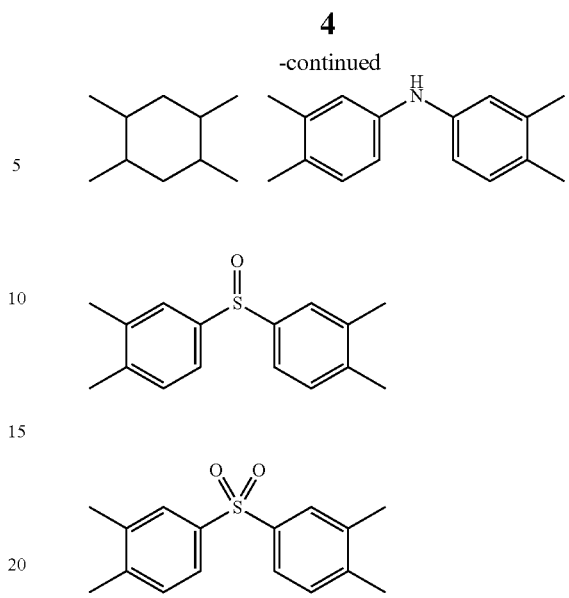

-continued

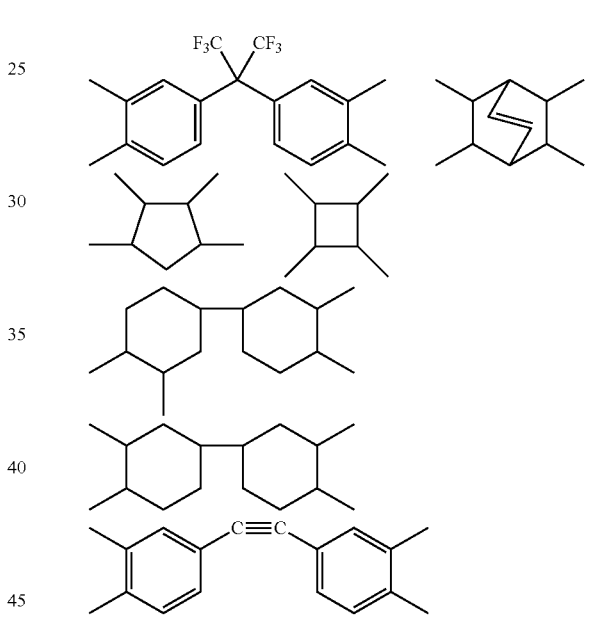

wherein bonds in the above structural formulae that are yet unbonded to substituent groups are to be bonded to carbonyl carbons forming cyclic imide structures in the formula (1).

[3]

The heat-curable maleimide resin composition according to [1] or [2], wherein B in the formula (1) represents a divalent hydrocarbon group derived from a diamine that is derived from a dimer acid.

[4]

A heat-curable maleimide resin composition comprising:
(A) a maleimide resin represented by the following formula (3) and having a number average molecular weight of not lower than 3,000;
(B) an organic compound having, in one molecule, at least one allyl group and at least one isocyanuric ring; and
(C) a reaction initiator,

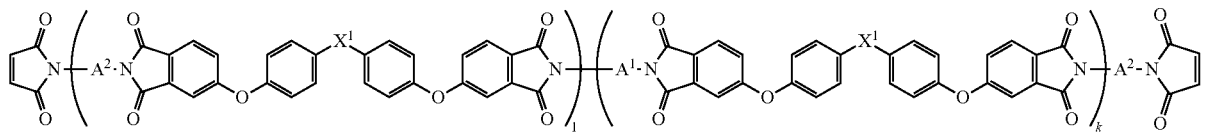

wherein $X^1$ independently represents a divalent group, k is a number of 1 to 30, l is a number of 0 to 10, each of $A^1$ and $A^2$ independently represents a divalent aromatic group, the divalent group represented by $X^1$ being selected from the following formulae,

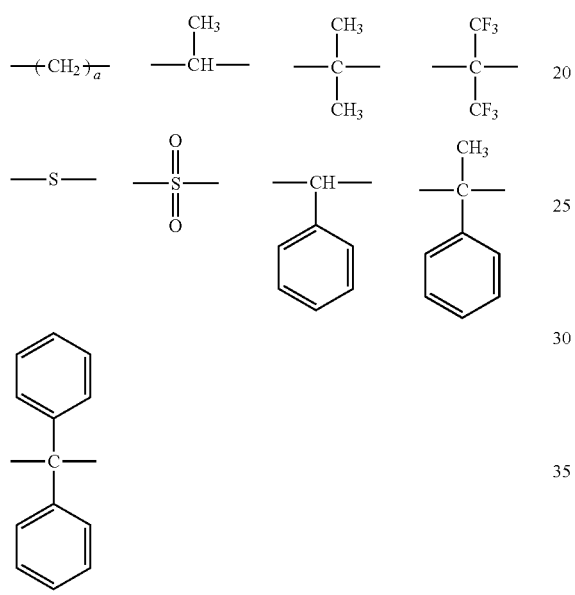

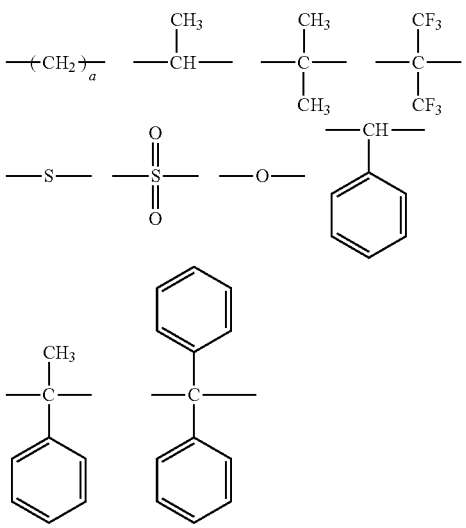

wherein a is a number of 1 to 6, and the divalent aromatic group represented by $A^1$ and $A^2$ being expressed by the following formula (4) or (5),

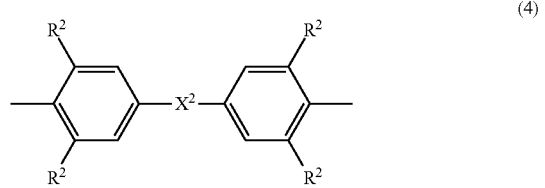

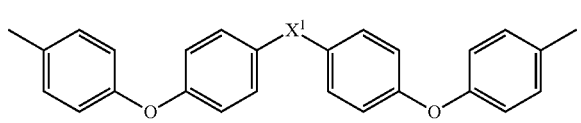

wherein $X^1$ is as defined in the formula (3), $R^2$ independently represents a hydrogen atom, a chlorine atom or a substituted or unsubstituted aliphatic hydrocarbon group having 1 to 6 carbon atoms, $X^2$ independently represents a divalent group selected from the following formulae, wherein a is a number of 1 to 6.

[5]
The heat-curable maleimide resin composition according to any one of [1] to [4], wherein the organic compound as the component (B) has, in one molecule, two or more allyl groups.

[6]
The heat-curable maleimide resin composition according to any one of [1] to [5], wherein the reaction initiator as the component (C) is a radical polymerization initiator.

[7]
An uncured resin film comprised of the heat-curable maleimide resin composition according to [1] or [4].

[8]
A cured resin film comprised of a cured product of the heat-curable maleimide resin composition according to [1] or [4].

[9]
A prepreg comprising the heat-curable maleimide resin composition according to [1] or [4]; and a fiber base material.

[10]
An adhesive agent comprised of the heat-curable maleimide resin composition according to [1] or [4].

[11]
A substrate comprising the heat-curable maleimide resin composition according to [1] or [4].

The heat-curable maleimide resin composition of the present invention can provide a cured product with a high glass-transition temperature, an excellent dielectric property and an excellent dimension stability. Further, the heat-curable maleimide resin composition of the present invention can be produced without using an aprotic polar solvent such as NMP, and the composition has an excellent handling property in terms of a cured and uncured film or sheet. Thus, the heat-curable maleimide resin composition of the present invention is particularly useful as a material for a substrate.

DETAILED DESCRIPTION OF THE INVENTION

The present invention is described in greater detail hereunder.

(A) Maleimide Resin with Number Average Molecular Weight of not Lower than 3,000

A component (A) used in the present invention is a maleimide resin having a number average molecular weight of not lower than 3,000, and is represented by a general formula (1) or (3). In general, many maleimide compounds are those having a number average molecular weight of not higher than 2,000. While many of these maleimide compounds having a number average molecular weight of not higher than 2,000 have a high Tg, they have a poor processibility and moldability in terms of obtaining a cured and uncured films; particularly, it is difficult to handle any of these maleimide compounds as a main component of a composition for use in a substrate. For this reason, the present invention employs a high molecular weight-type maleimide resin having a number average molecular weight of not lower than 3,000.

While there are no particular restrictions on the properties of the maleimide resin as the component (A) at room temperature, the number average molecular weight (Mn) thereof is not lower than 3,000, more preferably 3,500 to 50,000, particularly preferably 4,000 to 40,000, in terms of polystyrene when measured by gel permeation chromatography (GPC) under the following measurement condition(s). When such molecular weight is not lower than 3,000, a composition obtained can be easily turned into a film, and has a favorable handling property.

[Measurement Condition]
Developing solvent: Tetrahydrofuran (THF)
Flow rate: 0.35 mL/min
Detector: Differential refractive index detector (RI)
Column: TSK Guardcolumn Super H-L
TSKgel Super HZ4000 (4.6 mmI.D.×15 cm×1)
TSKgel Super HZ3000 (4.6 mmI.D.×15 cm×1)
TSKgel Super HZ2000 (4.6 mmI.D.×15 cm×2)
(Columns are all manufactured by TOSOH CORPORATION)
Column temperature: 40° C.
Sample injection volume: 5 μL (0.2% by mass THF solution)

Further, if using a maleimide resin represented by the following formula (1) or (3) as the component (A), not only both the cured and uncured films obtained will exhibit favorable mechanical properties and become easier to be handled, but there can also be obtained a composition having a high compatibility with a later-described component (B) and evenly expressing its properties regardless of location.

Maleimide Resin Represented by Formula (1)

(1)

In the formula (1), A independently represents a tetravalent organic group having a cyclic structure; particularly, it is preferred that A represent any one of the tetravalent organic groups expressed by the following structural formulae,

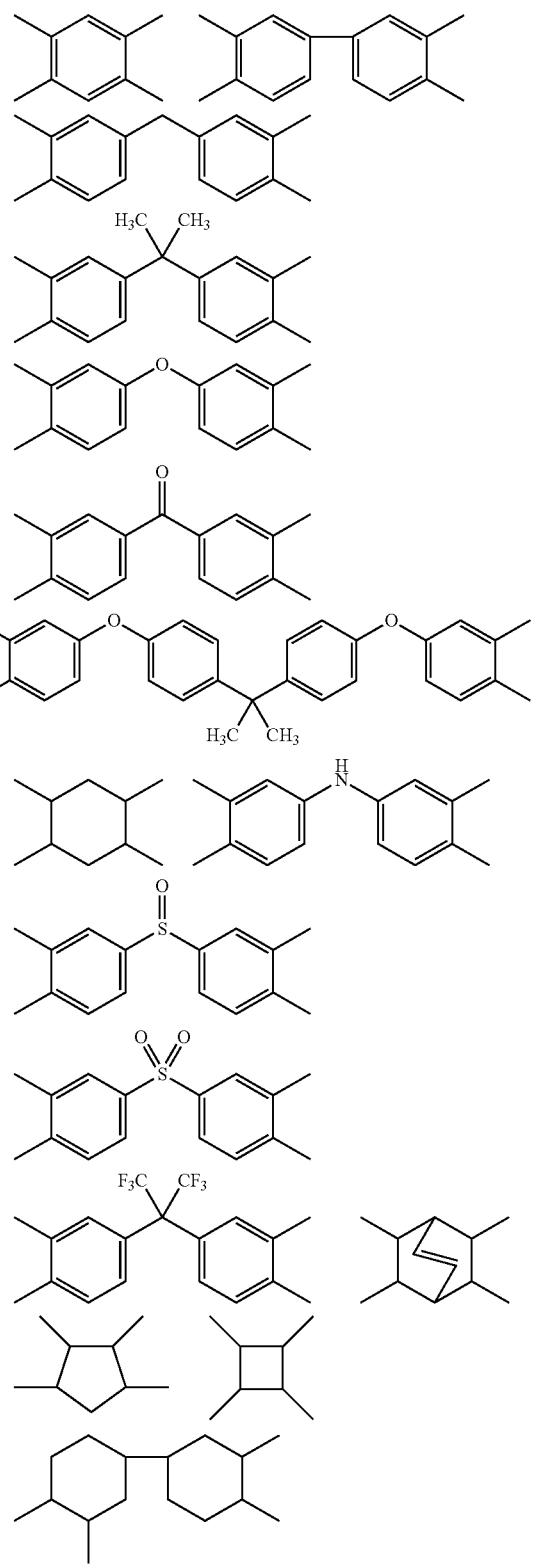

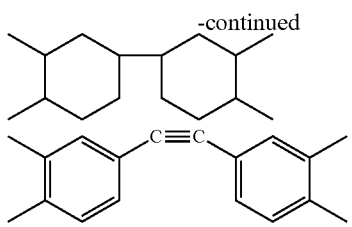

wherein bonds in the above structural formulae that are yet unbonded to substituent groups are to be bonded to carbonyl carbons forming cyclic imide structures in the general formula (1).

In the formula (1), B independently represents a divalent hydrocarbon group having 6 to 200 carbon atoms. It is preferred that B represent a divalent hydrocarbon group having 8 to 100, more preferably 10 to 50 carbon atoms. Particularly, it is preferred that B be a branched divalent hydrocarbon group obtained by substituting at least one hydrogen atom in the above divalent hydrocarbon group with an alkyl or alkenyl group(s) having 6 to 200, preferably 8 to 100, more preferably 10 to 50 carbon atoms. The branched divalent hydrocarbon group may be either a saturated aliphatic hydrocarbon group or an unsaturated hydrocarbon group, and may also have an alicyclic structure or an aromatic ring structure in the midway of the molecular chain.

Specifically, the branched divalent hydrocarbon group may, for example, be a divalent hydrocarbon group derived from a dual-end diamine called dimer diamine. Here, a dimer diamine is a compound derived from a dimer (dimer acid) of an unsaturated fatty acid such as oleic acid. Further, a dimer acid refers to a liquid dibasic acid whose main component is a dicarboxylic acid having 36 carbon atoms, which is generated by dimerizing an unsaturated fatty acid having 18 carbon atoms and employing a natural substance such as a vegetable fat and oil as a raw material; a dimer acid (dimer diamine) skeleton refers to a structure obtained by eliminating carboxy groups (amino groups) from the above dimer acid.

Thus, a dimer acid skeleton is not a skeleton of a single type, but may have multiple kinds of structures; there are known several kinds of isomers thereof. Typical dimer acids are categorized into groups titled (a) linear type, (b) monocyclic type, (c) aromatic ring type, and (d) polycyclic type.

That is, as B, preferable examples include branched divalent hydrocarbon groups each obtained by eliminating two carboxy groups from any of the dimer acids of the following (a) to (d).

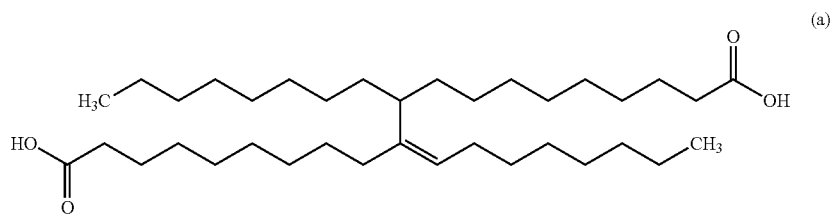

(a)

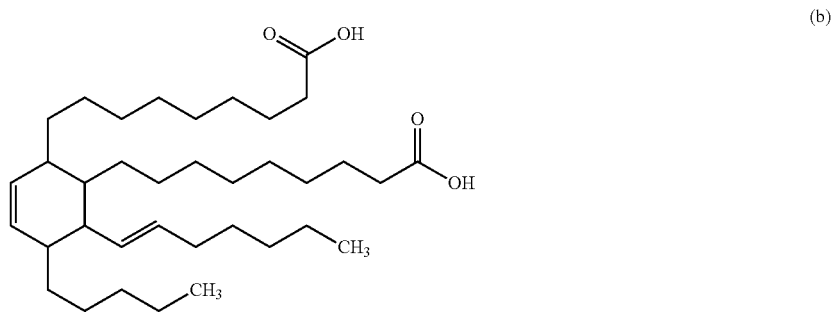

(b)

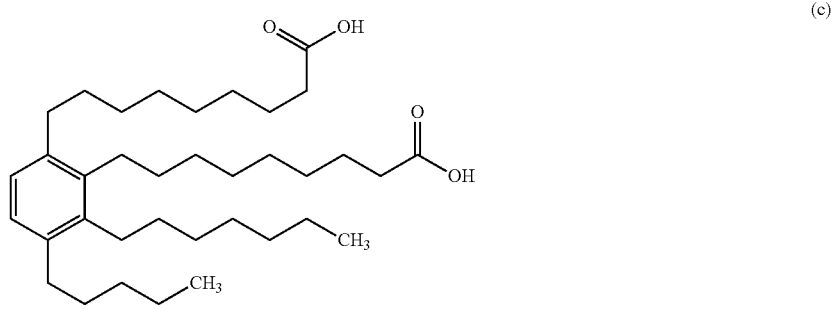

(c)

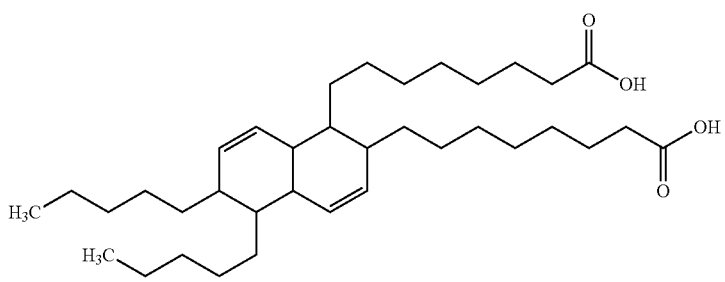
(d)

In the formula (1), Q independently represents a divalent alicyclic hydrocarbon group that has 6 to 60 carbon atoms and at least one cyclohexane skeleton represented by the following formula (2),

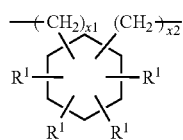
(2)

wherein IV independently represents a hydrogen atom or an alkyl group having 1 to 5 carbon atoms; each of x1 and x2 independently represents a number of 0 to 4. It is preferred that Q be a divalent alicyclic hydrocarbon group having 8 to 30, more preferably 10 to 20 carbon atoms.

Here, specific examples of IV include a hydrogen atom, a methyl group, an ethyl group, an n-propyl group, an isopropyl group, an n-butyl group, an isobutyl group and a t-butyl group. Among them, a hydrogen atom and a methyl group are preferred. Here, TVs may be identical to or different from one another.

Further, each of x1 and x2 independently represents a number of 0 to 4, preferably a number of 0 to 2. Here, x1 and x2 may be identical to or different from each other.

Specific examples of Q include divalent alicyclic hydrocarbon groups represented by the following formulae.

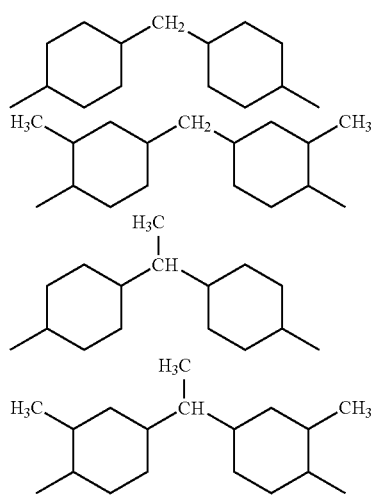

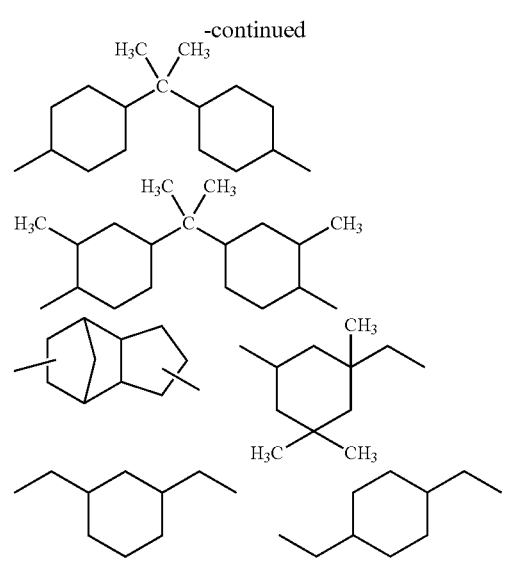

wherein bonds in the above structural formulae that are yet unbonded to substituent groups are to be bonded to nitrogen atoms forming cyclic imide structures in the formula (1).

In the formula (1), W is either B or Q. As for W, whether it will be a structural unit having B or Q shall depend on the difference in a later-described production method.

In the formula (1), n is 1 to 100, preferably 2 to 60, more preferably 5 to 50. Further, m is 0 to 100, preferably 1 to 50, more preferably 3 to 40. When n and m are too small, a cured product will become brittle, and thus easy to break; when n and m are too large, a fluidity will be impaired, which may lead to an inferior moldability.

Further, in the maleimide resin represented by the formula (1), there are no restrictions on an order in which the units identified by n and m are repeated; a bonding pattern of these units may be alternate, block or random, among which a block bonding pattern is preferred.

There are no particular restrictions on a method for producing the maleimide resin represented by the formula (1). The maleimide resin may, for example, be efficiently produced by the two methods shown below.

Production Method (1)-1

A first method for producing the maleimide resin includes a step A of synthesizing an amic acid with an acid anhydride represented by the following formula (6) and an alicyclic diamine represented by the following formula (7), and then performing cyclodehydration; a step B subsequent to the step A, which is a step of synthesizing an amic acid with the reactant obtained in the step A and a diamine represented by the following formula (8), and then performing cyclodehydration; and a step C subsequent to the step B, which is a step of synthesizing a maleamic acid with the reactant obtained in the step B and a maleic anhydride, and then performing cyclodehydration to block molecular chain ends with maleimide groups.

Production Method (1)-2

A second method for producing the maleimide resin includes a step A' of synthesizing an amic acid with the acid anhydride represented by the following formula (6) and the diamine represented by the following formula (8), and then performing cyclodehydration; a step B' subsequent to the step A', which is a step of synthesizing an amic acid with the reactant obtained in the step A' and the alicyclic diamine represented by the following formula (7), and then performing cyclodehydration; and a step C' subsequent to the step B', which is a step of synthesizing a maleamic acid with the reactant obtained in the step B' and a maleic anhydride, and then performing cyclodehydration to block molecular chain ends.

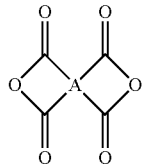

(6)

wherein A is defined as above in the formula (1).

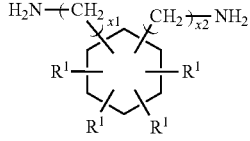

(7)

wherein $R^1$, x1 and x2 are defined as above in the formula (2).

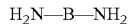

(8)

wherein B is defined as above in the formula (1).

The two production methods have now been described. As a basic pattern, the maleimide resin represented by the formula (1) can be obtained by the step A (or step A') of synthesizing an amic acid with a tetracarboxylic dianhydride and a diamine, and then performing cyclodehydration; the step B (or step B') subsequent to the step A (or step A'), which is a step of synthesizing an amic acid by adding a diamine other than that employed in the previous step A (or step A'), and then further performing cyclodehydration; and then the step C (or step C') subsequent to the step B (or step B'), which is a step of reacting a maleic anhydride to synthesize a maleamic acid, and then finally performing cyclodehydration to block molecular chain ends with maleimide groups. The above two production methods mainly differ from each other only in the order in which the different types of diamines are added.

In the above two production methods, the steps can be grouped into two categories which are the synthesis reaction of an amic acid or maleamic acid; and the cyclodehydration reaction. These reactions are described in detail hereunder.

In the step A (or step A'), an amic acid is at first synthesized by reacting a particular tetracarboxylic dianhydride with a particular diamine. This reaction usually proceeds in an organic solvent (e.g. non-polar solvent or high-boiling aprotic polar solvent) and at a temperature of room temperature (25° C.) to 100° C.

Next, the cyclodehydration reaction of the amic acid is performed in a way such that after reacting the amic acid at a temperature of 90 to 120° C., the cyclodehydration reaction is then caused to proceed while removing from the system a water produced as a by-product due to a condensation reaction. An organic solvent (e.g. non-polar solvent, high-boiling aprotic polar solvent) and/or an acid catalyst may also be added to promote the cyclodehydration reaction.

Examples of the organic solvent include toluene, xylene, anisole, biphenyl, naphthalene, N,N-dimethylformamide (DMF) and dimethylsulfoxide (DMSO). Any one of these organic solvents may be used alone, or two or more of them may be used in combination. Further, examples of the acid catalyst include sulfuric acid, methanesulfonic acid and trifluoromethanesulfonic acid. Any one of these acid catalysts may be used alone, or two or more of them may be used in combination.

A molar ratio between the tetracarboxylic dianhydride and the diamine is preferably tetracarboxylic dianhydride/diamine=1.01 to 1.50/1.0, more preferably tetracarboxylic dianhydride/diamine=1.01 to 1.35/1.0. By combining the tetracarboxylic dianhydride and the diamine at this ratio, there can be synthesized, as a result, a copolymer having an imide group at both ends.

In the step B (or step B'), an amic acid is at first synthesized by reacting the copolymer obtained in the step A (or step A') with a particular diamine, the copolymer being that having an imide group at both ends. This reaction also usually proceeds in an organic solvent (e.g. non-polar solvent or high-boiling aprotic polar solvent) and at a temperature of room temperature (25° C.) to 100° C.

Likewise, the subsequent cyclodehydration reaction of the amic acid is performed in a way such that after reacting the amic acid at a temperature of 95 to 120° C., the cyclodehydration reaction is then caused to proceed while removing from the system a water produced as a by-product due to a condensation reaction. An organic solvent (e.g. non-polar solvent, high-boiling aprotic polar solvent) and/or an acid catalyst may also be added to promote the cyclodehydration reaction.

Examples of the organic solvent include toluene, xylene, anisole, biphenyl, naphthalene, N,N-dimethylformamide (DMF) and dimethylsulfoxide (DMSO). Any one of these organic solvents may be used alone, or two or more of them may be used in combination. Further, examples of the acid catalyst include sulfuric acid, methanesulfonic acid and trifluoromethanesulfonic acid. Any one of these acid catalysts may be used alone, or two or more of them may be used in combination.

A molar ratio between the copolymer having an imide group at both ends and the diamine is preferably 1.0:1.6 to 2.5, more preferably 1.0:1.8 to 2.2.

In the step C (or step C'), a maleamic acid is synthesized by reacting, at a temperature of room temperature (25° C.) to 100° C., a diamine having an amino group at both ends with a maleic anhydride, the diamine being that obtained in the step B (or step B'). Finally, cyclodehydration is performed while removing from the system a water produced at 95 to 120° C. as a by-product, thereby blocking the molecular chain ends with maleimide groups, thus obtaining the target maleimide resin. It is preferred that the reaction for blocking the molecular chain ends with maleimide groups be performed at a temperature of not higher than 120° C., because side reactions are less likely to occur, and products with higher molecular weights are less likely to be produced.

With such production method(s), the maleimide resin obtained shall have the structure of a block copolymer, thereby homogenizing and improving the compatibility of the resin synthesized.

A molar ratio between the diamine having an amino group at both ends and the maleic anhydride is preferably 1.0:1.6 to 2.5, more preferably 1.0:1.8 to 2.2.

After the step C (or step C'), in accordance with a common method, the maleimide resin may be refined by, for example, performing reprecipitation.

Maleimide Resin Represented by Formula (3)

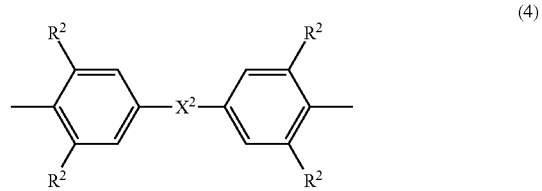

(4)

wherein $R^2$ independently represents a hydrogen atom, a chlorine atom or a substituted or unsubstituted aliphatic hydrocarbon group having 1 to 6 carbon atoms, and $X^2$ independently represents a divalent group selected from the following formulae,

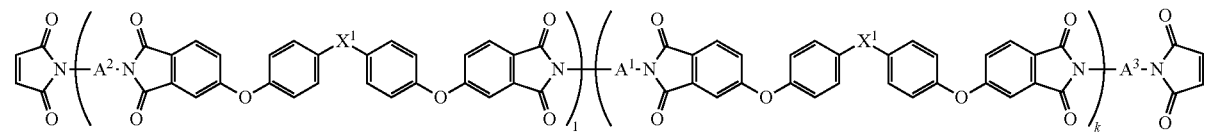

(3)

In the formula (3), $X^1$ independently represents a divalent group selected from the following formulae:

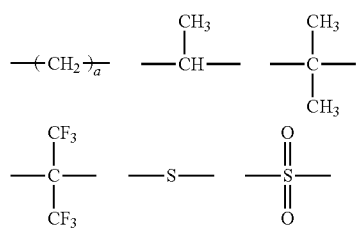

wherein a is a number of 1 to 6.

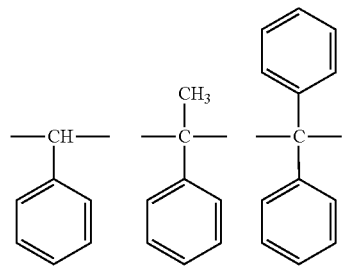

It is preferred that $X^1$ in the formula (3) be —$CH_2$—, —$C(CH_3)_2$— in terms of raw material availability.

In the formula (3), k is a number of 1 to 30, preferably a number of 2 to 20. When k is within these ranges, a favorable balance will be observed between a solubility of the maleimide resin represented by the formula (3) in the solvent when the composition has not yet cured; a film forming capability of the composition; and a toughness and heat resistance of the cured product obtained. l is a number of 0 to 10, preferably a number of 0 to 5, more preferably 1.

In the formula (3), each of $A^1$ and $A^2$ independently represents a divalent aromatic group expressed by the following formula (4) or (5):

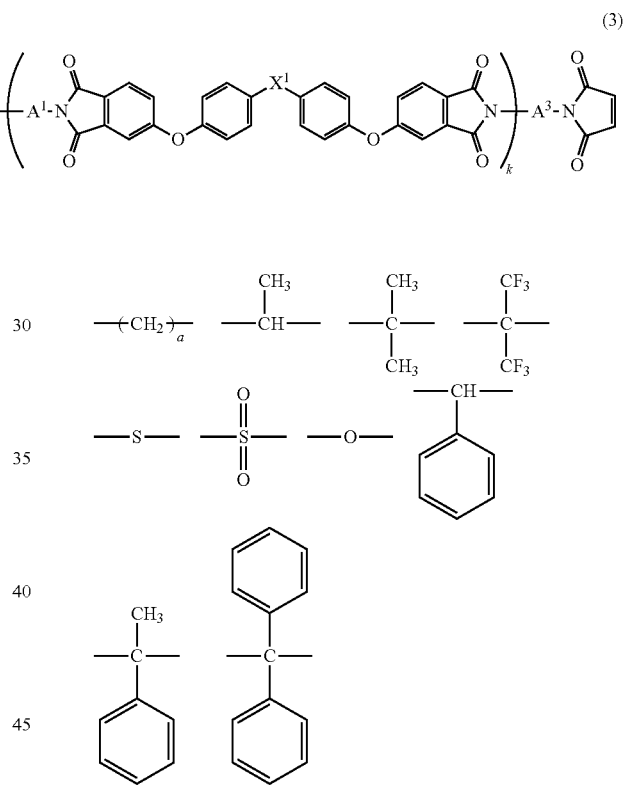

wherein a is a number of 1 to 6;

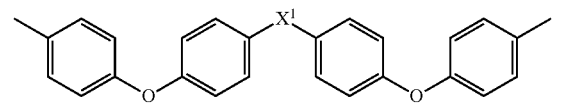

(5)

wherein $X^1$ is defined as above.

It is preferred that $X^2$ in the formula (4) be —$CH_2$—, —$C(CH_3)_2$— in terms of raw material availability.

As the substituted or unsubstituted aliphatic hydrocarbon group having 1 to 6 carbon atoms, as represented by $R^2$ in the formula (4), there can be listed, for example, a methyl group, an ethyl group, an n-propyl group, an isopropyl group, an n-butyl group, a t-butyl group and a cyclohexyl group; as well as groups obtained by substituting part of or all the hydrogen atoms in any of these groups with, for example, halogen atoms such as F, Cl and Br atoms, examples of which may include a trifluoromethyl group. In terms of raw material availability, it is preferred that $R^2$ be a hydrogen atom or a substituted or unsubstituted aliphatic hydrocarbon group having 1 to 3 carbon atoms; it is more preferred that $A^1$ and $A^2$ differ from each other. In the formula (3), when $A^1$ is represented by the formula (4), $A^2$ is represented by the formula (5); or when $A^1$ is represented by the formula (5), $A^2$ is represented by the formula (4).

Further, it is preferred that $X^1$ in the formula (3) and $X^1$ in the formula (5) represent an identical divalent group. This means that there exist two or more identical bisphenol skeletons, and that the maleimide resin represented by the formula (3) is produced using a divalent acid anhydride having an identical bisphenol skeleton(s) and a diamine.

There are no particular restrictions on a method for producing the maleimide resin represented by the formula (3). The maleimide resin may, for example, be efficiently produced by the two methods shown below.

Production Method (3)-1

A first method for producing the maleimide resin includes a step D of synthesizing an amic acid with an aromatic diphthalic anhydride represented by the following formula (9) and an aromatic diamine represented by the following formula (10), and then performing cyclodehydration; a step E subsequent to the step D, which is a step of synthesizing an amic acid with the reactant obtained in the step D and an aromatic diamine represented by the following formula (11), and then performing cyclodehydration; and a step F subsequent to the step E, which is a step of synthesizing a maleamic acid by reacting the reactant obtained in the step E with a maleic anhydride, and then performing cyclodehydration to block molecular chain ends with maleimide groups.

Production Method (3)-2

A second method for producing the maleimide resin includes a step D' of synthesizing an amic acid with the aromatic diphthalic anhydride represented by the following formula (9) and the aromatic diamine represented by the following formula (11), and then performing cyclodehydration; a step E' subsequent to the step D', which is a step of synthesizing an amic acid with the reactant obtained in the step D' and the aromatic diamine represented by the following formula (10), and then performing cyclodehydration; and a step F' subsequent to the step E', which is a step of synthesizing a maleamic acid by reacting the reactant obtained in the step E' with a maleic anhydride, and then performing cyclodehydration to block molecular chain ends with maleimide groups.

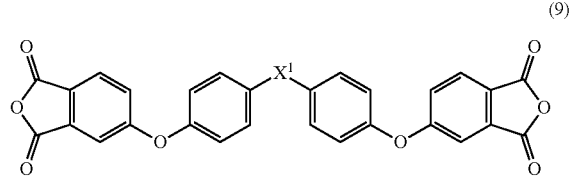

(9)

wherein $X^1$ is defined as above in the formula (3).

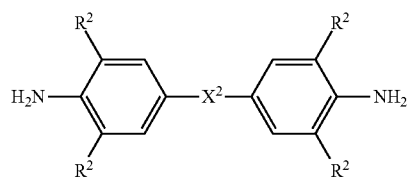

(10)

wherein $R^2$ and $X^2$ are defined as above in the formula (4).

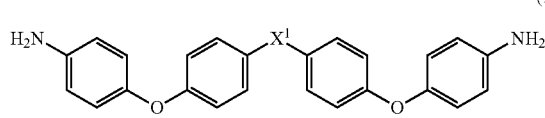

(11)

wherein $X^1$ is defined as above in the formula (3).

The two production methods have now been described. As a basic pattern, the maleimide resin represented by the formula (3) can be obtained by the step D (or step D') of synthesizing an amic acid with an aromatic diphthalic anhydride and an aromatic diamine, and then performing cyclodehydration; the step E (or step E') subsequent to the step D (or step D'), which is a step of synthesizing an amic acid by adding an aromatic diamine other than that employed in the previous step D (or step D'), and then further performing cyclodehydration; and then the step F (or step F') subsequent to the step E (or step E'), which is a step of reacting a maleic anhydride to synthesize a maleamic acid, and then finally performing cyclodehydration to block molecular chain ends with maleimide groups. The above two production methods mainly differ from each other only in the order in which the different types of aromatic diamines are added.

In the above two production methods, the steps can be grouped into two categories which are the synthesis reaction of an amic acid or maleamic acid; and the cyclodehydration reaction. These reactions are described in detail hereunder.

In the step D (or step D'), an amic acid is at first synthesized by reacting a particular aromatic diphthalic anhydride with a particular aromatic diamine. This reaction usually proceeds in a high-boiling aprotic polar solvent at a temperature of room temperature (25° C.) to 100° C. However, in a reaction between an aromatic diphthalic anhydride and an aromatic diamine, instead of a high-boiling aprotic polar solvent, anisole and a derivative thereof (e.g. o-methylanisole, p-methylanisole) may be used as a solvent.

Next, the cyclodehydration reaction of the amic acid is performed in a way such that after reacting the amic acid at a temperature of 120 to 180° C., the cyclodehydration reaction is then caused to proceed while removing from the system a water produced as a by-product due to a condensation reaction. A high-boiling aprotic polar solvent and/or an acid catalyst may also be added to promote the cyclodehydration reaction.

Examples of the high-boiling aprotic polar solvent include N,N-dimethylformamide (DMF) and dimethylsulfoxide (DMSO). Any one of these organic solvents may be used alone, or two or more of them may be used in combination. Further, examples of the acid catalyst include sulfuric acid, methanesulfonic acid and trifluoromethanesulfonic acid. Any one of these acid catalysts may be used alone, or two or more of them may be used in combination.

A compounding ratio between the aromatic diphthalic anhydride and the aromatic diamine is preferably aromatic diphthalic anhydride/aromatic diamine=1.01 to 1.50/1.0, more preferably aromatic diphthalic anhydride/aromatic diamine=1.01 to 1.15/1.0, in terms of molar ratio. By combining the tetracarboxylic dianhydride and the diamine at this ratio, there can be synthesized, as a result, a copolymer having an imide group at both ends.

In the step E (or step E'), an amic acid is at first synthesized by reacting the copolymer obtained in the step D (or step D') with a particular aromatic diamine, the copolymer being that having an imide group at both ends. This reaction also usually proceeds in a high-boiling aprotic polar solvent at a temperature of room temperature (25° C.) to 100° C. However, in a reaction between a copolymer having an imide group at both ends and a particular aromatic diamine, instead of a high-boiling aprotic polar solvent, it is preferred that there be used, as a solvent, anisole and a derivative thereof (e.g. o-methylanisole, p-methylanisole). Any one of these solvents may be used alone, or two or more of them may be used in combination.

Likewise, the subsequent cyclodehydration reaction of the amic acid is performed in a way such that after reacting the amic acid at a temperature of 120 to 180° C., the cyclodehydration reaction is then caused to proceed while removing from the system a water produced as a by-product due to a condensation reaction. A high-boiling aprotic polar solvent and/or an acid catalyst may also be added to promote the cyclodehydration reaction.

Examples of the high-boiling aprotic polar solvent include N,N-dimethylformamide (DMF) and dimethylsulfoxide (DMSO). Any one of these organic solvents may be used alone, or two or more of them may be used in combination. Further, examples of the acid catalyst include sulfuric acid, methanesulfonic acid and trifluoromethanesulfonic acid. Any one of these acid catalysts may be used alone, or two or more of them may be used in combination.

A compounding ratio between the copolymer having an imide group at both ends and the aromatic diamine is preferably 1.0:1.6 to 2.5, more preferably 1.0:1.8 to 2.2, in terms of molar ratio.

In the step F (or step F'), a maleamic acid is synthesized by reacting, at a temperature of room temperature (25° C.) to 100° C., a diamine having an amino group at both ends with a maleic anhydride, the diamine being that obtained in the step E (or step E'). Finally, cyclodehydration is performed while removing from the system a water produced at 120 to 180° C. as a by-product, thereby blocking the molecular chain ends with maleimide groups, thus obtaining the target maleimide resin.

A compounding ratio between the diamine having an amino group at both ends and the maleic anhydride is preferably 1.0:1.6 to 2.5, more preferably 1.0:1.8 to 2.2, in terms of molar ratio.

After the step F (or step F'), in accordance with a common method, the maleimide resin may be refined by, for example, performing reprecipitation.

One kind of the maleimide resin as the component (A) may be used alone, or two or more kinds thereof may be used in combination. It is preferred that the component (A) be contained in the composition of the present invention by an amount of 5 to 95% by mass, more preferably 20 to 90% by mass.

(B) Organic Compound Having, in One Molecule, at Least One Allyl Group and at Least One Isocyanuric Ring A component (B) used in the present invention is an organic compound having, in one molecule, at least one allyl group and at least one isocyanuric ring, and is used as a cross-linking agent. Thus, the organic compound has, in one molecule, at least one, preferably two or more allyl groups. Further, an isocyanuric ring has a high heat resistance, and serves to improve mechanical properties and a dielectric property after curing.

As the component (B), there are, for example, those having an epoxy group, acryloyl group or carboxyl group, those that are silicone-modified, and those that are ether-modified; particularly, in terms of dielectric property, preferred are alkyldiallyl isocyanurates such as triallyl isocyanurate and diallylmethyl isocyanurate.

It is preferred that the component (B) be added in an amount of 3 to 50 parts by mass, preferably 5 to 25 parts by mass, per 100 parts by mass of a sum total of the components (A) and (B).

(C) Reaction Initiator

A reaction initiator as a component (C) used in the present invention is added to promote a single cross-linking reaction between the maleimide groups in the component (A) and the allyl groups in the component (B); and a cross-linking reaction between the components (A) and (B). There are no particular restrictions on the component (C) so long as it is capable of promoting the cross-linking reactions, examples of which may include ion catalysts such as imidazoles, tertiary amines, quaternary ammonium salts, boron trifluoride amine complex, organophosphines and organophosphonium salts; and radical polymerization initiators such as an organic peroxide, hydroperoxide and azoisobutyronitrile. Even among these examples, an organic peroxide is particularly preferred in terms of promoting the cross-linking between the components (A) and (B). Examples of such organic peroxide include dicumylperoxide, t-butyl peroxybenzoate, t-amyl peroxybenzoate, dibenzoyl peroxide and dilauroyl peroxide.

One kind of the reaction initiator as the component (C) may be used alone, or two or more kinds thereof may be used in combination.

It is preferred that the reaction initiator be added in an amount of 0.05 to 10 parts by mass, more preferably 0.1 to 5 parts by mass, per 100 parts by mass of the sum total of the components (A) and (B). If the amount of the reaction initiator added is out of the above ranges, a poor balance may be observed between the heat resistance of the cured product and a moisture resistance thereof, and a curing speed at the time of molding may be either extremely slow or extremely fast.

Further, it is a known fact that the curing speed at the time of molding varies depending on the type of a reaction initiator; for example, if using an organic peroxide, the half-life temperature of the organic peroxide has to be checked. There is a significant correlation between a half-life temperature and a reaction starting temperature.

Other Additives

Various additives may further be added to the heat-curable maleimide resin composition of the present invention as necessary, so long as the effects of the present invention will not be impaired. Examples of such additives are as follows.

Heat-Curable Resin Having Reactive Group Reactive with Maleimide Group

In addition to the component (B), the present invention may further contain a heat-curable resin having a reactive group(s) reactive with maleimide groups.

There are no restrictions on the type of such heat-curable resin, examples of which may include various resins other than the component (A), such as an epoxy resin, a phenolic resin, a melamine resin, a silicone resin, a cyclic imide resin, a urea resin, a heat-curable polyimide resin, a modified polyphenylene ether resin, a heat-curable acrylic resin and an epoxy-silicone hybrid resin. Further, as a reactive group (s) reactive with maleimide groups, there may be listed, for example, an epoxy group; a maleimide group; a hydroxyl group; an acid anhydride group; an alkenyl group such as an allyl group and a vinyl group; a (meth)acrylic group; and a thiol group. Here, an allyl group-containing compound as an other additive is a compound having no isocyanuric ring, and shall be distinguished from the component (B).

In terms of reactivity, it is preferred that the reactive group(s) in the heat-curable resin be selected from an epoxy group, a maleimide group, a hydroxyl group, an acid anhydride group and an alkenyl group; in terms of dielectric property, it is more preferred that the reactive group be an alkenyl group or a (meth)acrylic group.

Here, the heat-curable resin having the reactive group(s) reactive with maleimide groups is added in an amount of 0 to 30% by mass per a sum total of the component (A), the component (B) and the heat-curable resin having the reactive group(s) reactive with maleimide groups.

Inorganic Filler

The present invention may further contain an inorganic filler. The inorganic filler may be added for the purpose of, for example, improving the strength and rigidity of the cured product of the heat-curable maleimide resin composition of the present invention, or adjusting a coefficient of thermal expansion and a dimension stability of the cured product. As the inorganic filler, there may be used those that are normally added to an epoxy resin composition or a silicone resin composition. Examples of such inorganic filler include silicas such as a spherical silica, a molten silica and a crystalline silica; alumina; silicon nitride; aluminum nitride; boron nitride; barium sulfate; talc; clay; aluminum hydroxide; magnesium hydroxide; calcium carbonate; glass fibers; and glass particles. Further, in order to improve a dielectric property, there may be used a fluorine resin-containing or -coated filler; and/or hollow particles. Furthermore, in order to, for example, impart an electrical conductivity, there may also be added an electrically conductive filler(s) such as metal particles, metal-coated inorganic particles, carbon fibers and carbon nanotubes. One kind of such inorganic filler may be used alone, or two or more kinds thereof may be used in combination.

While there are no particular restrictions on the average particle size or shape of the inorganic filler, a spherical silica having an average particle size of 0.5 to 5 μm is especially preferably used if forming a film or a substrate. Here, the term "average particle size" refers to a value obtained as a mass average value $D_{50}$ (or median diameter) in particle size distribution measurement that is carried out by a laser light diffraction method.

Moreover, in order to improve the properties of the inorganic filler, it is preferred that the inorganic filler be such an inorganic filler that has already been surface-treated by a silane coupling agent having an organic group(s) reactive with maleimide groups. Examples of such coupling agent include an epoxy group-containing alkoxysilane, an amino group-containing alkoxy silane, a (meth)acrylic group-containing alkoxysilane and an alkenyl group-containing alkoxysilane.

As such silane coupling agent, a (meth)acrylic group- and/or amino group-containing alkoxy silane is preferably used, examples of which include 3-methacryloxypropyltrimethoxysilane, 3-acryloxypropyltrimethoxysilane, N-phenyl-3-aminopropyltrimethoxysilane, N-2-(aminoethyl)-3-aminopropyltrimethoxysilane and 3-aminopropyl trimethoxy silane.

Others

Other than the inorganic filler and the heat-curable resin, there may also be added, for example, a non-functional silicone oil, a thermoplastic resin, a thermoplastic elastomer, an organic synthetic rubber, a photosensitizer, a light stabilizer, a polymerization inhibitor, a flame retardant, a colorant, a dye and an adhesion aid; or even an ion trapping agent for the purpose of improving an electric property.

The heat-curable maleimide resin composition of the present invention may also be treated as a varnish after being dissolved in an organic solvent. When in the state of a varnish, this composition is easier to be molded into the shape of a film, and is easier to be applied to or impregnate a glass cloth made of, for example, an E glass, a low-dielectric glass or a quartz glass. There are no restrictions on the organic solvent, so long as it is capable of dissolving the component (A), the component (B), and the heat-curable resin as an other additive that has the reactive group(s) reactive with maleimide groups. Examples of such organic solvent include anisole, tetralin, xylene, toluene, tetrahydrofuran (THF), dimethylformamide (DMF), dimethylsulfoxide (DMSO) and acetonitrile. Any one of these organic solvents may be used alone, or two or more of them may be used in combination.

This heat-curable maleimide resin composition can be turned into an uncured resin sheet or an uncured resin film by applying the aforementioned varnish to a base material, and then volatilizing the organic solvent; and further turned into a cured resin sheet or a cured resin film by curing them. One example of a method for producing such sheet or film is described below; the production method shall not be limited to the method exemplified.

For example, the heat-curable maleimide resin composition dissolved in the organic solvent (i.e. varnish) may be applied to a base material, followed by performing heating at a temperature of normally not lower than 80° C., preferably not lower than 100° C. for 0.5 to 5 hours so as to remove the organic solvent, and then performing another round of heating at a temperature of not lower than 130° C., preferably not lower than 150° C. for 0.5 to 10 hours so as to form a strong maleimide resin cured film having a flat surface.

While a constant temperature may be used in each of the drying step for removing the organic solvent and the subsequent heat curing step, it is preferred that the temperature be raised in a stepwise manner. In this way, the organic solvent can be efficiently eliminated from the composition, and the curing reaction of the resin can take place efficiently as well.

Examples of a method for applying the varnish include, but are not particularly limited to methods using a spin coater, a slit coater, a sprayer, a dip coater or a bar coater.

The base material may be a generally used base material, examples of which include those made of polyolefin resins such as polyethylene (PE) resin, polypropylene (PP) resin and polystyrene (PS) resin; and polyester resins such as polyethylene terephthalate (PET) resin, polybutylene terephthalate (PBT) resin and polycarbonate (PC) resin. The surfaces of these base materials may be those that have already been subjected to a mold release treatment. Further, there are no particular restrictions on the thickness of a coating layer; a thickness after removing the solvent is in a range of 1 to 100 μm, preferably 3 to 80 μm. A cover film may further be provided on the coating layer.

Also, the components may be premixed in advance, followed by using a melt-kneading machine to extrude the mixture into the shape of a sheet or film before direct use.

In addition to the cured film obtained by curing the heat-curable maleimide resin composition of the present invention being superior in heat resistance, mechanical properties, electric properties, adhesion to base materials, and solvent resistance, the cured film also has a low permittivity. Thus, this cured film can be utilized as, for example, a film for use in a semiconductor device, specifically a passivation film or protective film provided on the surface of a semiconductor element; a junction protective film for use in junction areas of, for example, a diode and a transistor; and an α-ray shielding film, interlayer insulation film and ion implantation mask for a VLSI. Other than these purposes, the cured film may also be utilized as a conformal coating film for a printed circuit board, an oriented film for an LCD element, a protective film for glass fibers, and a surface protective film for a solar cell. Further, the heat-curable maleimide resin composition of the present invention may be utilized for a wide range of purposes such as that of a paste composition, in a sense that, for example, if containing an inorganic filler(s), the composition can be used as a paste composition for printing; and if containing an electrically conductive filler(s), the composition may be used as an electrically conductive paste composition. Particularly, use as an adhesive agent is preferred.

Further, since the composition of the present invention can be turned into a film or a sheet while being in an uncured state, has a favorable handling property, possesses a self-adhesiveness and is superior in dielectric property, the composition of the invention can be particularly preferably used in a bonding film for use in a flexible printed circuit board (FPC) or the like. Moreover, the cured resin film may also be used as a coverlay film.

Also, a glass cloth or the like that is made of, for example, an E-glass, a low-dielectric glass or a quartz glass may at first be impregnated with the heat-curable maleimide resin composition that has been turned into a varnish, followed by removing the organic solvent therefrom so as to achieve a semi-cured state, thereby allowing the composition to be used as a prepreg. Further, a rigid substrate can be produced by laminating such prepreg, a copper foil and the like.

Production Method

As a method for producing the heat-curable maleimide resin composition of the present invention, there may be employed, for example, a method where the components (A), (B) and (C) as well as the other additives that are added as necessary are to be mixed by, for example, a planetary mixer (by INOUE MFG., INC.), or a mixer "THINKY CONDITIONING MIXER" (by THINKY CORPORATION).

WORKING EXAMPLES

The present invention is described in detail hereunder with reference to working and comparative examples. However, the present invention is not limited to the following working examples.

Components used in working and comparative examples are shown below. Here, a number average molecular weight (Mn) is measured under the following measurement condition.

Developing solvent: Tetrahydrofuran (THF)

Flow rate: 0.35 mL/min

Detector: Differential refractive index detector (RI)

Column: TSK Guardcolumn Super H-L

TSKgel Super HZ4000 (4.6 mmI.D.×15 cm×1)

TSKgel Super HZ3000 (4.6 mmI.D.×15 cm×1)

TSKgel Super HZ2000 (4.6 mmI.D.×15 cm×2)

(Columns are all produced by TOSOH CORPORATION)

Column temperature: 40° C.

Sample injection volume: 5 µL (0.2% by mass THF solution)

(A) Maleimide Resin

Synthesis Example 1 (Production of Bismaleimide Compound, Reaction Formula 1)

Isophoronediamine of 37.25 g (0.219 mol), pyromellitic dianhydride of 76.94 g (0.35 mol) and toluene of 350 g were added to a 2 L glass four-necked flask equipped with a stirrer, a Dean-Stark tube, a cooling condenser and a thermometer, followed by stirring them at 80° C. for three hours to synthesize an amic acid. Next, the temperature was directly raised to 110° C., and stirring was performed for another four hours while distilling away a water produced as a by-product, thereby synthesizing a block copolymer.

Later, 116.88 g (0.219 mol) of Priamine-1075 (by CRODA, a dimer diamine-containing diamine compound expressed by $H_2N-C_{36}H_{70}-NH_2$ (average composition formula)) was added to the flask containing the solution of the block copolymer, the solution having been cooled to room temperature. Stirring was then performed at 80° C. for three hours to synthesize an amic acid. Next, the temperature was directly raised to 110° C., and stirring was performed for another four hours while distilling away a water produced as a by-product, thereby synthesizing a dual-end diamine compound.

After cooling the flask containing the dual-end diamine compound solution obtained to room temperature, 18.88 g (0.193 mol) of maleic anhydride was added thereto, followed by heating the flask again and performing stirring at 80° C. for three hours to synthesize an amic acid. Next, the temperature was directly raised to 110° C., and stirring was performed for another 15 hours while distilling away a water produced as a by-product, followed by performing washing with 300 g of water five times so as to obtain a varnish of a bismaleimide compound. Later, a reprecipitation step was carried out by delivering the varnish into 3,000 g of hexane by drops, followed by removing the solvent and then performing drying so as to obtain a target seal brown solid which was a bismaleimide compound represented by the following formula (A-1). Mn of this bismaleimide compound was 8,000.

(Reaction formula 1)

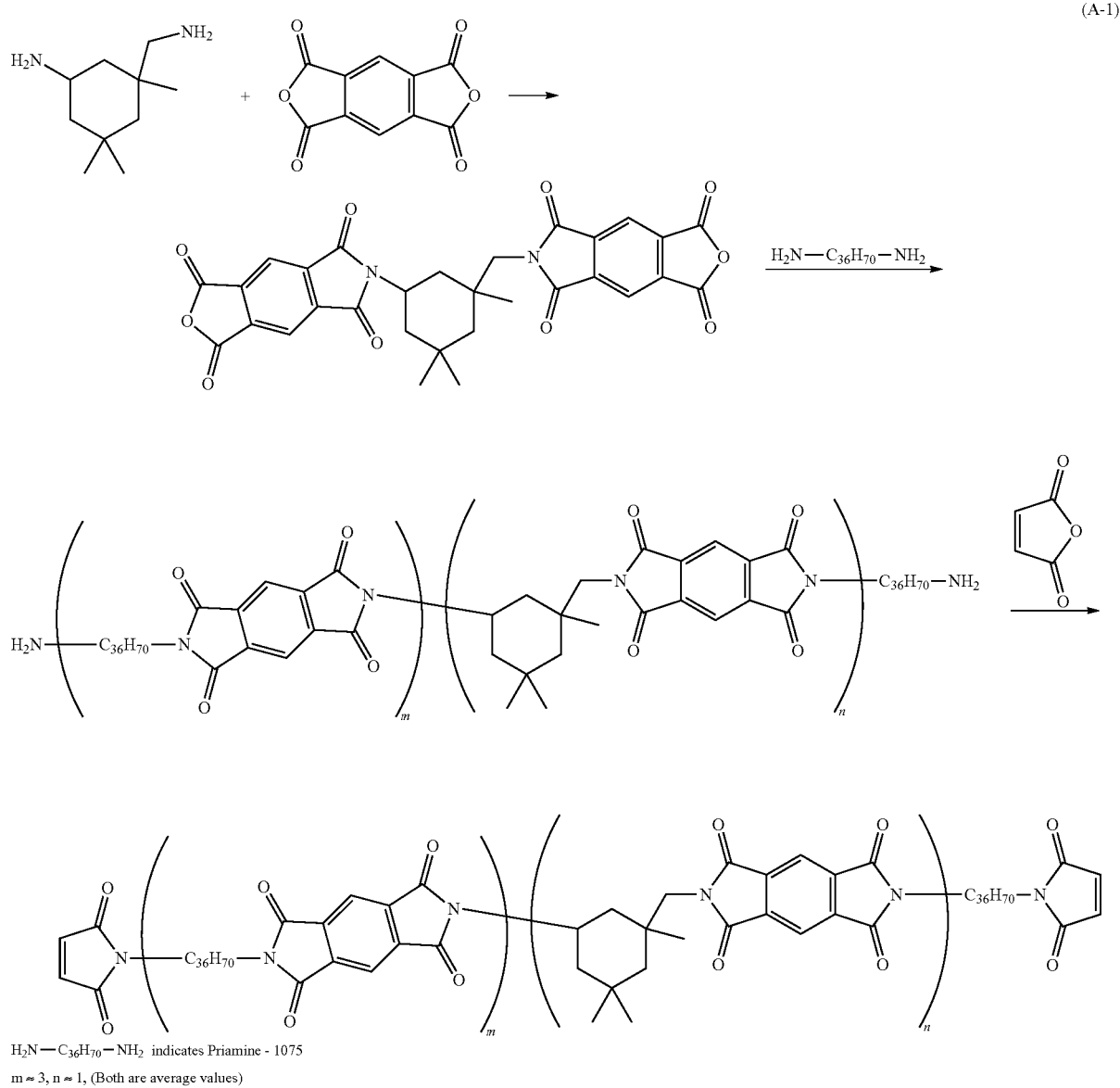

H₂N—C₃₆H₇₀—NH₂ indicates Priamine - 1075
m ≈ 3, n ≈ 1, (Both are average values)

Synthesis Example 2

2,2-bis[4-(2,3-dicarboxyphenoxy)phenyl]propane dianhydride of 65.06 g (0.125 mol), 4,4-methylenebis(2,6-diethylaniline) of 35.26 g (0.115 mol) and anisole of 250 g were added to a 1 L glass four-necked flask equipped with a stirrer, a Dean-Stark tube, a cooling condenser and a thermometer, followed by stirring them at 80° C. for three hours to synthesize an amic acid. Next, the temperature was directly raised to 150° C., and stirring was performed for another two hours while distilling away a water produced as a by-product, thereby synthesizing a block copolymer.

Later, 7.05 g (0.015 mol) of 2,2-bis[4-(4-aminophenoxy)phenyl]propane was added to the flask containing the solution of the block copolymer, the solution having been cooled to room temperature. Stirring was then performed at 80° C. for three hours to synthesize an amic acid. Next, the temperature was directly raised to 150° C., and stirring was performed for another two hours while distilling away a water produced as a by-product, thereby synthesizing a dual-end diamine compound.

After cooling the flask containing the dual-end diamine compound solution obtained to room temperature, 1.45 g (0.015 mol) of maleic anhydride was added thereto, followed by performing stirring at 80° C. for three hours to synthesize a maleamic acid. Next, the temperature was directly raised to 150° C., and stirring was performed for another two hours while distilling away a water produced as a by-product, thereby obtaining a varnish of a bismaleimide compound represented by the following formula (A-2). A non-volatile content(s) was adjusted to 40% by mass without completely removing anisole. Mn of the bismaleimide compound represented by the formula (A-2) was 11,500.

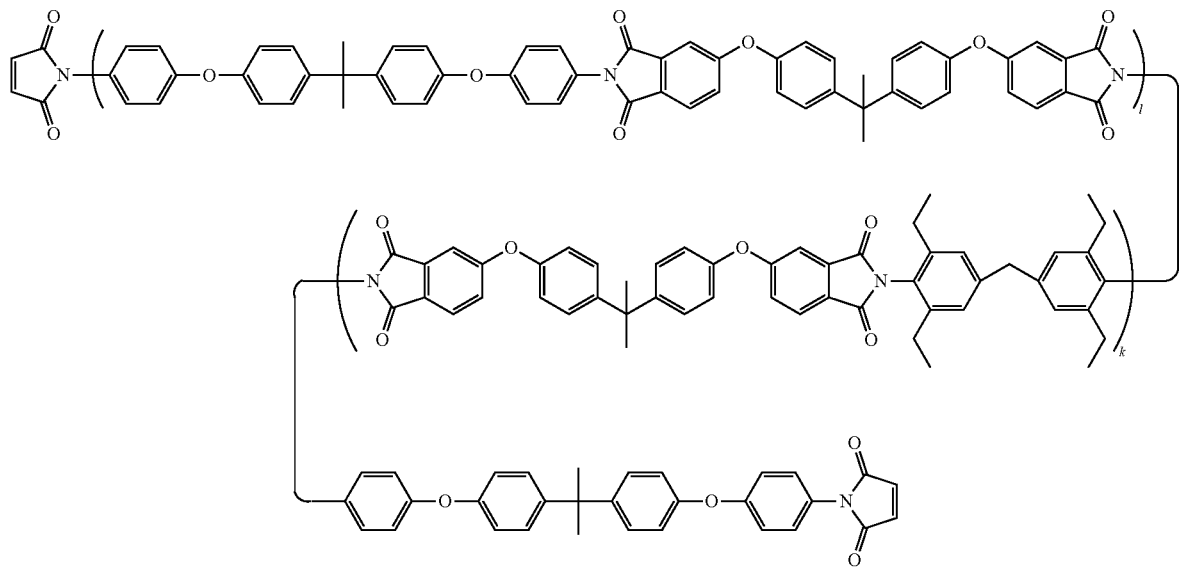

k = 8, l = 1 (Both are average values)

(A-3): Bismaleimide compound containing linear alkylene group represented by the following formula (BMI-3000J by Designer Molecules Inc., Mn: 7,500, for use in comparative example)

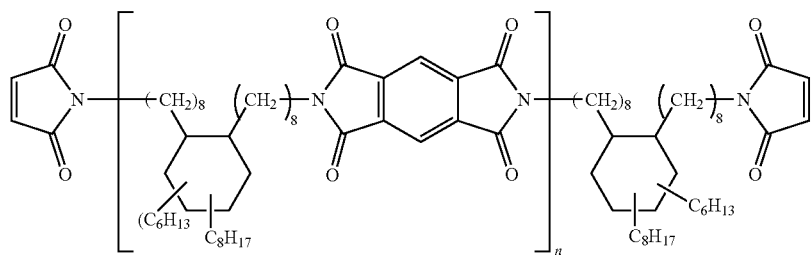

n≈5 (Average value)

(A-4): 4,4'-diphenylmethanebismaleimide (BMI-1000 by Daiwakasei Industry Co., Ltd., Mn: 358, for use in comparative example)

(A-5): Bismaleimide compound containing linear alkylene group represented by the following formula (BMI-1500 by Designer Molecules Inc., Mn: 2,400, for use in comparative example)

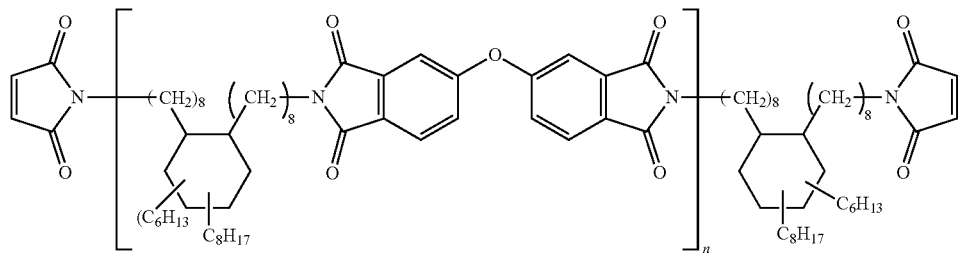

n≈3 (Average value)

(B) Organic Compound Having, in One Molecule, at Least One Allyl Group and at Least One Isocyanuric Ring
- (B-1): Triallyl isocyanurate (TAIC by Mitsubishi Chemical Corporation.)
- (B-2): Alkyldiallyl isocyanurate (L-DAIC by SHIKOKU CHEMICALS CORPORATION)
- (B-3): Diallyl isophthalate (DAISO DAP 100 monomer by OSAKA SODA CO., LTD., for use in comparative example)
- (B-4): Bifunctional acrylic monomer (KAYARAD R-684 by Nippon Kayaku Co., Ltd., for use in comparative example)
- (B-5): Tris(2-acryloyloxyethyl)isocyanurate (FA-731A by Hitachi Chemical Company, Ltd., for use in comparative example)

(C) Reaction Initiator
- (C-1) Dicumylperoxide (PERCUMYL D by NOF CORPORATION)

Production of Film

At the compounding ratios shown in Tables 1 and 2, an anisole varnish having 50% by mass of non-volatile contents was prepared. A roller coater was then used to apply such heat-curable maleimide resin composition in the varnish state to a PET film of a thickness of 38 μm in a manner such that the composition would have a thickness of 50 μm after drying, followed by performing drying at 120° C. for 10 min to obtain an uncured resin film. The uncured resin film was then placed on a tetrafluoroethylene-ethylene copolymer resin film (AFLEX by AGC Inc.) of a thickness of 100 μm in a manner such that the resin layer of the uncured resin film would be in contact with the tetrafluoroethylene-ethylene copolymer resin film, followed by performing curing at 180° C. for two hours so as to obtain a cured resin film.

Here, in the following evaluation tests, subjected to various evaluation tests were an uncured resin film from which the PET film had been peeled off; and a cured resin film from which the PET film and the tetrafluoroethylene-ethylene copolymer resin film had been peeled off. The results thereof are shown in Tables 1 and 2.

Film Handling Property

The uncured resin film and the cured resin film were each bended to a 180° angle 100 times; "○" was given to examples exhibiting no flaws such as film breakage, whereas "x" was given to examples exhibiting flaws such as film breakage.

Relative Permittivity, Dielectric Tangent

A network analyzer (E5063-2D5 by Keysight Technologies) and a stripline (by KEYCOM Corporation) were connected to the cured resin film to measure a relative permittivity and a dielectric tangent thereof at a frequency of 10 GHz.

Glass-Transition Temperature

A glass-transition temperature (Tg) of the cured resin film was measured by DMA-800 manufactured by TA Instruments.

Coefficient of Thermal Expansion (CTE)

A coefficient of thermal expansion (CTE) of the cured resin film was measured by TMA-Q400 manufactured by TA Instruments. As coefficients of thermal expansion, values measured in a range of 0 to 40° C. were used.

TABLE 1

| Composition table (part by mass) | | | Working example 1 | 2 | 3 | 4 | 5 |
|---|---|---|---|---|---|---|---|
| (A) | Synthesis example 1 | A-1 | 80.0 | 70.0 | 70.0 | 90.0 | 70.0 |
| | BMI-3000J | A-3 | | | 10.0 | | |
| | BMI-1000 | A-4 | | | | | |
| | BMI-1500 | A-5 | | | | | 20.0 |
| (B) | TAIC | B-1 | 20.0 | 30.0 | 30.0 | | |
| | L-DAIC | B-2 | | | | 10.0 | 10.0 |
| | DAISO DAP Monomer | B-3 | | | | | |
| | KAYARAD R-684 | B-4 | | | | | |
| | FA-731A | B-5 | | | | | |
| (C) | PERCUMYL D | C-1 | 1.0 | 1.0 | 1.0 | 1.0 | 1.0 |
| Evaluation results | Uncured film handling property | | ○ | ○ | ○ | ○ | ○ |
| | Cured film handling property | | ○ | ○ | ○ | ○ | ○ |
| | Relative permittivity (10 GHz) | | 2.52 | 2.53 | 2.42 | 2.47 | 2.48 |
| | Dielectric tangent (10 GHz) | | 0.0018 | 0.0020 | 0.0018 | 0.0013 | 0.0020 |
| | Glass-transition temperature(° C.) | | 165 | 169 | 143 | 150 | 149 |
| | CTE (ppm/K) | | 86 | 79 | 85 | 89 | 92 |

TABLE 2

| Composition table (part by mass) | | | Comparative example 1 | 2 | 3 | 4 | 5 | 6 | 7 | 8 | 9 | 10 | 11 |
|---|---|---|---|---|---|---|---|---|---|---|---|---|---|
| (A) | Synthesis example 1 | A-1 | 100.0 | | | | | 80.0 | 80.0 | | 80.0 | | |
| | BMI-3000J | A-3 | | 100.0 | 80.0 | | | | | | | | |
| | BMI-1000 | A-4 | | | | 100.0 | 80.0 | | | | | | |

TABLE 2-continued

| Composition table (part by mass) | | | Comparative example | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| (B) | BMI-1500 | A-5 | | | | | | | | 50.0 | | | 80.0 |
| | TAIC | B-1 | | 20.0 | | 20.0 | | | | 50.0 | | 100.0 | 20.0 |
| | L-DAIC | B-2 | | | | | | | | | | | |
| | DAISO DAP Monomer | B-3 | | | | | 20.0 | | | | | | |
| | KAYARAD R-684 | B-4 | | | | | | | 20.0 | | | | |
| | FA-731A | B-5 | | | | | | | | | 20.0 | | |
| (C) | PERCUMYL D | C-1 | 1.0 | 1.0 | 1.0 | 1.0 | 1.0 | 1.0 | 1.0 | 1.0 | 1.0 | 1.0 | 1.0 |
| Evaluation results | Uncured film handling property | | x | ○ | ○ | x *1 | x *1 | ○ | x | x *2 | x | *3 | x |
| | Cured film handling property | | ○ | ○ | ○ | x *1 | x *1 | ○ | x | ○ | ○ | | ○ |
| | Relative permittivity (10 GHz) | | 2.50 | 2.40 | 2.50 | 3.10 | 3.10 | 2.80 | 2.60 | 2.60 | 2.80 | | 2.68 |
| | Dielectric tangent (10 GHz) | | 0.0018 | 0.0017 | 0.0030 | 0.0085 | 0.0075 | 0.0056 | 0.0115 | 0.0038 | 0.0103 | | 0.0031 |
| | Glass-transition temperature (° C.) | | 140 | 45 | 50 | 220 | 170 | 145 | 100 | 130 | 165 | | <15 |
| | CTE (ppm/K) | | 100 | 139 | 128 | 60 | 65 | 98 | 103 | 120 | 100 | | 131 |

*1 Not only a poor film handling property was observed, but dissolution residues were also observed in the stage of varnish due to an inherently low solvent solubility.
*2 A strong tackiness was observed in liquid form; failed to be handled as a film.
*3 Failed to obtain a cured product due to an extremely low viscosity.

Production of Film

Working Example 6

Here, 12.0 g of (B-1) and 0.24 g of (C-1) were added to 30 g of the varnish obtained in the synthesis example 2 that had 40% by mass of non-volatile contents, followed by stirring them well at room temperature. A roller coater was then used to apply such heat-curable maleimide resin composition in the varnish state to a PET film of a thickness of 38 μm in a manner such that the composition would have a thickness of 50 μm after drying, followed by performing drying at 150° C. for 10 min to obtain an uncured resin film. The uncured resin film was then placed on a tetrafluoroethylene-ethylene copolymer resin film (AFLEX by AGC Inc.) of a thickness of 100 μm in a manner such that the resin layer of the uncured resin film would be in contact with the tetrafluoroethylene-ethylene copolymer resin film, followed by performing curing at 180° C. for two hours so as to obtain a cured resin film.

Comparative Example 12

A cured resin film was obtained via a process identical to that of the working example 6, except that (B-1) was not added, and that the amount of (C-1) was changed to 0.12 g.

Comparative Examples 13 to 15

A cured resin film was obtained via a process identical to that of the working example 6, except that instead of (B-1), each of (B-3) to (B-5) was used.

As for each film produced in the working example 6 and the comparative examples 12 to 15, in the following evaluation tests, subjected to various evaluation tests were an uncured resin film from which the PET film had been peeled off; and a cured resin film from which the PET film and the tetrafluoroethylene-ethylene copolymer resin film had been peeled off. The results thereof are shown in Table 3.

Film Handling Property

The uncured resin film and the cured resin film were each bended to a 180° angle 100 times; "○" was given to examples exhibiting no flaws such as film breakage, whereas "x" was given to examples exhibiting flaws such as film breakage.

Relative Permittivity, Dielectric Tangent

The network analyzer (E5063-2D5 by Keysight Technologies) and the stripline (by KEYCOM Corporation) were connected to the cured resin film to measure the relative permittivity and dielectric tangent thereof at the frequency of 10 GHz.

Glass-Transition Temperature

The glass-transition temperature (Tg) of the cured resin film was measured by DMA-800 manufactured by TA Instruments.

Coefficient of Thermal Expansion (CTE)

A coefficient of thermal expansion (CTE) of the cured resin film was measured by TMA-Q400 manufactured by TA Instruments. As coefficients of thermal expansion, values measured in a range of 0 to 40° C. were used.

TABLE 3

| Composition table (part by mass) | | | Working example 6 | Comparative example 12 | Comparative example 13 | Comparative example 14 | Comparative example 15 |
|---|---|---|---|---|---|---|---|
| (A) | Synthesis example 2 | A-2 | 30.0 | 30.0 | 30.0 | 30.0 | 30.0 |
| | BMI-3000J | A-3 | | | | | |
| | BMI-1000 | A-4 | | | | | |
| | BMI-1500 | A-5 | | | | | |
| (B) | TAIC | B-1 | 12.0 | | | | |
| | L-DAIC | B-2 | | | | | |
| | DAISO DAP Monomer | B-3 | | | 12.0 | | |
| | KAYARAD R-684 | B-4 | | | | 12.0 | |
| | FA-731A | B-5 | | | | | 12.0 |
| (C) | PERCUMYL D | C-1 | 0.24 | 0.12 | 0.24 | 0.24 | 0.24 |
| Evaluation results | Uncured film handling property | | ○ | ○ | ○ | x | x |
| | Cured film handling property | | ○ | ○ | ○ | ○ | x |
| | Relative permittivity (10 GHz) | | 2.8 | 2.8 | 2.9 | 3.0 | 2.9 |
| | Dielectric tangent (10 GHz) | | 0.0040 | 0.0075 | 0.0092 | 0.0152 | 0.0136 |
| | Glass-transition temperature(° C.) | | 219 | 220 | 203 | 169 | 199 |
| | CTE (ppm/K) | | 48 | 55 | 54 | 60 | 58 |

As can be seen from the above results, the heat-curable maleimide resin composition of the present invention was confirmed to be useful as an insulation material suitable for use in a substrate, because the cured product of the composition has an excellent high-temperature property due to its high glass-transition temperature, and an excellent dielectric property; and because the uncured and cured resin films comprised of the composition have an excellent handling property.

What is claimed is:

1. A heat-curable maleimide resin composition comprising:
   (A) a maleimide resin represented by the following formula (1) and having a number average molecular weight of not lower than 3,000, the component (A) being contained in the composition within a range from 20 to 90% by mass;
   (B) an organic compound having, in one molecule, at least one allyl group and at least one isocyanuric ring, the component (B) being contained in the composition in an amount of 5 to 25 parts by mass per 100 parts by mass of a sum total of the components (A) and (B); and
   (C) a reaction initiator in an amount of 0.1 to 5 parts by mass per 100 parts by mass of the sum total of the components (A) and (B),

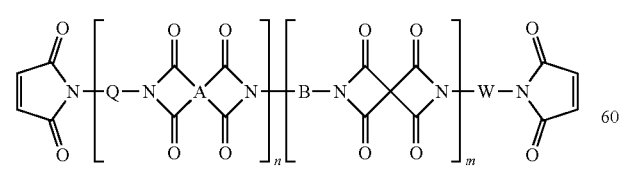

(1)

wherein A independently represents a tetravalent organic group having a cyclic structure,
B independently represents a divalent hydrocarbon group having 6 to 200 carbon atoms, Q independently represents a divalent alicyclic hydrocarbon group expressed by any one of the following formulae:

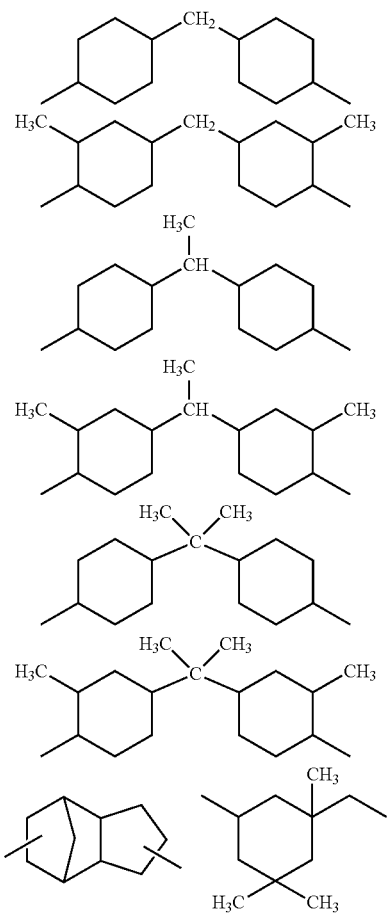

wherein bonds in the above structural formulae that are yet unbonded to substituent groups are to be bonded to nitrogen atoms forming cyclic imide structures in the formula (1), W is either B or Q, n is 1 to 100, m is 0 to 100, repeating units identified by n and m are present in any order, a bonding pattern of the repeating units n and m may be alternate, block or random.

2. The heat-curable maleimide resin composition according to claim 1, wherein A in the formula (1) represents any one of the tetravalent organic groups expressed by the following structural formulae:

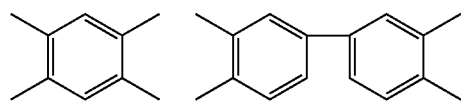

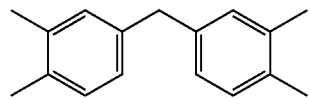

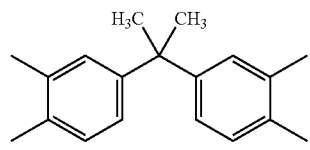

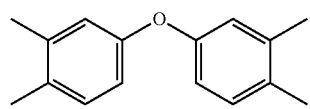

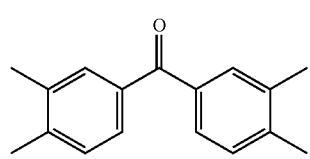

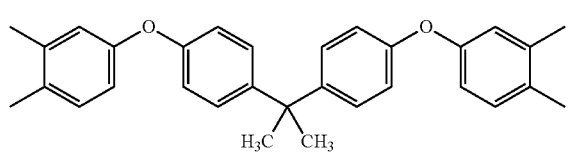

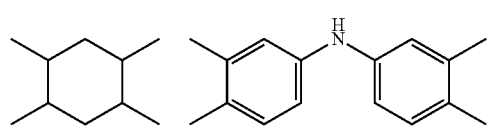

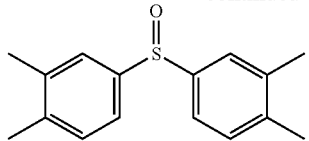

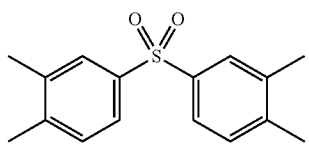

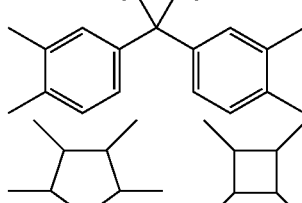

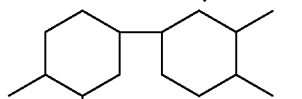

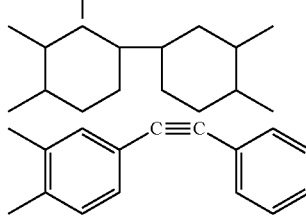

wherein bonds in the above structural formulae that are yet unbonded to substituent groups are to be bonded to carbonyl carbons forming cyclic imide structures in the formula (1).

3. The heat-curable maleimide resin composition according to claim 1, wherein B in the formula (1) represents a divalent hydrocarbon group derived from a diamine that is derived from a dimer acid.

4. The heat-curable maleimide resin composition according to claim 1, wherein the organic compound as the component (B) has, in one molecule, two or more allyl groups.

5. The heat-curable maleimide resin composition according to claim 1, wherein the reaction initiator as the component (C) is a radical polymerization initiator.

6. An uncured resin film comprised of the heat-curable maleimide resin composition according to claim 1.

7. A cured resin film comprised of a cured product of the heat-curable maleimide resin composition according to claim 1.

8. A prepreg comprising the heat-curable maleimide resin composition according to claim 1; and a fiber base material.

9. An adhesive agent comprised of the heat-curable maleimide resin composition according to claim 1.

10. A substrate comprising the heat-curable maleimide resin composition according to claim 1.

11. The heat-curable maleimide resin composition according to claim 1, wherein said component (A) is a member selected from the group consisting of:

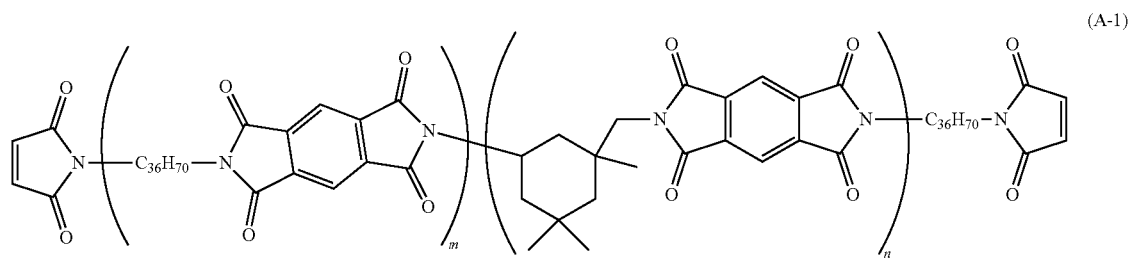

(A-1)

$m \approx 3$, $n \approx 1$, wherein both are average values

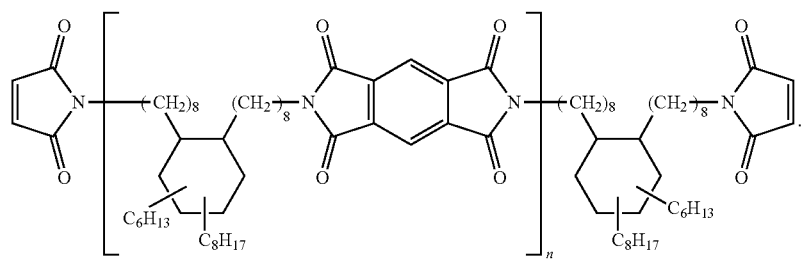

$n \approx 5$, which is an average value

12. The heat-curable maleimide resin composition according to claim 11, wherein said component (B) is a member selected from the group consisting of triallyl isocyanurate and alkyldiallyl isocyanurate.

13. The heat-curable maleimide resin composition according to claim 12, wherein said component (C) is dicumylperoxide.

14. The heat-curable maleimide resin composition according to claim 13, wherein the component (A) is contained in said composition in an amount of 70 to 90% by mass.

15. The heat-curable maleimide resin composition according to claim 14, wherein the component (C) is contained in said composition in an amount of 1 part by mass per 100 parts by mass of a sum total of the components (A) and (B).

\* \* \* \* \*